United States Patent
Sevenich et al.

(10) Patent No.: US 9,928,113 B2
(45) Date of Patent: Mar. 27, 2018

(54) INTELLIGENT COMPILER FOR PARALLEL GRAPH PROCESSING

(71) Applicant: Oracle International Corporation, Redwood Shores, CA (US)

(72) Inventors: Martin Sevenich, Palo Alto, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 638 days.

(21) Appl. No.: 14/543,058

(22) Filed: Nov. 17, 2014

(65) Prior Publication Data

US 2016/0140152 A1    May 19, 2016

(51) Int. Cl.
| | | |
|---|---|---|
| *G06F 17/30* | (2006.01) | |
| *G06F 9/50* | (2006.01) | |
| *G06F 9/44* | (2018.01) | |
| *G06F 9/45* | (2006.01) | |
| *H04L 29/08* | (2006.01) | |

(52) U.S. Cl.
CPC .............. *G06F 9/5083* (2013.01); *G06F 8/31* (2013.01); *G06F 8/456* (2013.01); *G06F 17/30321* (2013.01); *G06F 17/30386* (2013.01); *G06F 17/30442* (2013.01); *G06F 17/30958* (2013.01); *H04L 67/10* (2013.01)

(58) Field of Classification Search
None
See application file for complete search history.

(56) References Cited

U.S. PATENT DOCUMENTS

| | | |
|---|---|---|
| 7,971,194 B1 | 6/2011 | Gilboa |
| 9,182,952 B2 | 11/2015 | Qi |
| 2002/0087275 A1 | 7/2002 | Kim |
| 2002/0129340 A1 | 9/2002 | Tuttle |
| 2007/0038987 A1* | 2/2007 | Ohara ................. G06F 8/45 717/151 |
| 2007/0239694 A1 | 10/2007 | Singh |

(Continued)

OTHER PUBLICATIONS

U.S. Appl. No. 14/524,838, filed Oct. 27, 2014, Final Office Action, dated Feb. 9, 2017.

(Continued)

*Primary Examiner* — Son T Hoang
(74) *Attorney, Agent, or Firm* — Hickman Palermo Becker Bingham LLP; Daniel D. Ledesma (57) ABSTRACT

An analyzer (such as a compiler) searches for a program portion that matches a pattern that may suffer from workload imbalance due to nodes with high degrees (i.e., relatively many edges). Such a pattern involves iteration over at least a subset (or all) of the nodes in a graph. If a program portion that matches the pattern is found, then the analyzer determines whether the body of the iteration contains an iteration over edges or neighbors of each node in the subset. If so, then the analyzer transforms the graph analytic program by adding code and, optionally, modifying existing code so that high-degree nodes are processed differently than low-degree nodes. High-degree nodes are processed sequentially while low-degree nodes are processed in parallel. Conversely, edges of high-degree nodes are processed in parallel while edges of low-degree nodes are processed sequentially.

22 Claims, 4 Drawing Sheets

(56) References Cited

U.S. PATENT DOCUMENTS

| | | | |
|---|---|---|---|
| 2008/0028474 A1* | 1/2008 | Horne | G06F 21/16 726/27 |
| 2009/0119641 A1 | 5/2009 | Ramsey | |
| 2009/0235237 A1 | 9/2009 | Song | |
| 2010/0088665 A1 | 4/2010 | Langworthy | |
| 2010/0088666 A1 | 4/2010 | Box | |
| 2011/0307897 A1 | 12/2011 | Atterbury | |
| 2012/0159459 A1 | 6/2012 | Turner | |
| 2013/0013567 A1* | 1/2013 | Constantinescu | G06F 17/30073 707/667 |
| 2013/0097136 A1 | 4/2013 | Goldberg | |
| 2013/0290282 A1 | 10/2013 | Faerber | |
| 2013/0305095 A1 | 11/2013 | Chishiro | |
| 2014/0136555 A1 | 5/2014 | Jacob | |
| 2014/0195518 A1 | 7/2014 | Kelsey | |
| 2014/0359559 A1 | 12/2014 | Qi | |
| 2015/0022538 A1 | 1/2015 | Munshi | |
| 2015/0024158 A1 | 1/2015 | Bhargava | |
| 2015/0026158 A1 | 1/2015 | Jin | |
| 2015/0095182 A1 | 4/2015 | Zhou | |
| 2015/0363476 A1* | 12/2015 | Li | G06F 17/30569 707/714 |
| 2015/0378697 A1 | 12/2015 | Sathyanathan | |
| 2016/0117358 A1 | 4/2016 | Schmid et al. | |
| 2016/0188391 A1 | 6/2016 | Ekanadham | |
| 2016/0292303 A1 | 10/2016 | Hong | |
| 2016/0342445 A1 | 11/2016 | Lugt et al. | |

OTHER PUBLICATIONS

Lugt, U.S. Appl. No. 14/718,430, filed May 21, 2015, Office Action, dated Jan. 11, 2017.

Schmid, U.S. Appl. No. 14/524,838, filed Oct. 27, 2014, Office Action, dated Jun. 12, 2017.

Schmid, U.S. Appl. No. 14/524,838, filed Oct. 27, 2014, Advisory Action, dated Apr. 4, 2017.

Lught, U.S. Appl. No. 14/718,430, filed May 21, 2015, Notice of Allowance, dated Apr. 20, 2017.

Karypis, et al., "Multilevel Algorithms for Multi-Constraint Graph Partitioning", Technical Report #98-019, dated May 5, 1998, 25 pages.

U.S. Appl. No. 14/524,838, filed Oct. 27, 2014, Office Action, dated Sep. 28, 2016.

Open MP Application Program, http://www.openmp.org/mp-documents/OpenMP_4.0_RC2.pdf dated 2013, 418 pages.

http://docs.oracle.com/javase/7/docs/api/java/util/concurrent/ForkJoinPool.html, "Class ForkJoinPool", last viewed May 20, 2015, 11 pages.

Schmid, U.S. Appl. No. 14/524,838, filed Oct. 27, 2014, Notice of Allowance, dated Dec. 6, 2017.

Xin et al., "GraphX Resilient Distributed Graph System on Spark", dated Jun. 23, 2013, Proceedings of the First International Workshop on Graph Data Management, 6 Pages. Open MP Application Program, http://www.openmp.org/mpdocuments/OpenMP_4.0_RC2.pdf dated 2013, 418 pages.

Nelson et al., "Latency-Tolerant Software Distributed Shared Memory", Technical Report UW-CSE-14-05-03, dated 2014, 13 pages.

Malewicz et al., "Pregel: A System for Large-Scale Graph Processing", SIGMOD, ACM, dated Jun. 2010, 11 pages.

Low et al., "GraphLab: A New Framework for Parallel Machine Learning", dated Jun. 25, 2010, 10 pages.

Grappa, "Scaling Data-intensive Applications on Commodity Clusters", http://grappa.io/, last viewed on May 6, 2015, 4 pages. Giraph "Introduction to Apache Giraph", http://giraph.apache.org/intro.html, last viewed on May 6, 2015, 2 pages.

\* cited by examiner

INTELLIGENT COMPILER FOR PARALLEL GRAPH PROCESSING

CROSS-REFERENCE TO RELATED APPLICATIONS

This application is related to U.S. patent application Ser. No. 14/524,838, filed on Oct. 27, 2014, the entire contents of each which is hereby incorporated by reference as if fully set forth herein.

FIELD OF THE DISCLOSURE

The present disclosure relates generally to graph processing and, more specifically, to analyzing graph analytic programs to identify code portions that may be optimized for parallel execution.

BACKGROUND

Graph analysis is a type of data analysis where the dataset is modeled as a graph. Graph analysis is used to identify arbitrary relationships between data entities. By applying certain graph analysis algorithms on a graph, a user may be able to discover non-immediate insight about the data set as analysis may consider even indirect relationships between data entities.

Many different data sets can be represented as graphs. For example, friendship relationships in a social network naturally form a graph. Real-world graphs, such as social network graphs, tend to exhibit different characteristics than classic graphs, such as trees, meshes, and hyper-cubes. As an example of a characteristic, real-world graphs show power-law degree distribution, which means that most nodes in the graph have only a small number of edges, while a few nodes have an extremely large number of edges. For example, according to the degree distribution of Twitter's follower graph, about 96% of all nodes have less than 100 edges, while about 0.01% of all nodes are connected to 25% of all edges in the graph, with roughly one hundred nodes having more than $10^6$ edges.

Graph analysis programs are often parallelized by exploiting their inherent vertex-parallelism. In other words, a certain function is applied to every vertex in the graph in parallel. Often the "vertex function" iterates over all the edges of a vertex. Existing graph processing systems, such as GraphLab or Giraph, make use of this vertex-parallelism. Such systems maintain multiple threads (or processes) and let each thread handle a chunk of vertices at a time.

However, conventional methods of exploiting vertex-parallelism lead to serious performance issues when applied to real-world graph instances. For example, a vertex function iterates over all edges belonging to a vertex. The extreme skewness of the degree distribution leads to poor load balancing between different threads. That is, one thread deals with the high-degree nodes and most of the other threads only deal with low-degree nodes. Such poor load balancing affects the performance of a program in a very negative way and could completely negate the positive effects of parallelizing the algorithm.

One approach to address the issue of extreme degree distribution skewedness is by applying chunking and work stealing. In this scheme, vertices (or nodes) of a graph are partitioned into multiple chunks (or sets) where each chunk has the same (or similar) number of vertices. Each thread picks up one chunk and processes the vertices belonging to the thread. When a thread finishes its chunk, the thread either grabs a new chunk or, if the work queue is empty, "steals" another chunk from another thread that still has unprocessed chunks in its respective chunk queue. Although this approach somewhat reduces the load balancing problem, it is not a perfect solution. For example, if a graph contains a "super" node to which 60% of all the nodes in the graph are connected, then the chunk that contains the super node will cause significant workload imbalance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for analyzing a graph analytic program to address one or more workload imbalance issues. A graph analytic program is analyzed (e.g., by a compiler) to determine whether a portion of the graph analytic program might suffer from workload imbalance. If so, then code that determines a degree of each node that is to be traversed is generated. The degree of a node indicates how many edges (or neighbors) the node has. For nodes that have a relatively high degree (e.g., nodes with over 1,000 edges), each such node is considered sequentially but the edges (or neighbors) of a high-degree node may be processed in parallel. Conversely, for nodes that have a relatively low degree, such nodes are processed in parallel.

In one technique, a graph analytic program is written in a high-level (e.g., domain-specific) language where a compiler is able to understand the semantics of the program and, thus, use the semantic information to rewrite the program to handle high-degree nodes and low-degree nodes differently.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. In the context of relational data, one non-limiting example of a database language that is supported by many database servers is SQL, including proprietary forms of SQL supported by such database servers as Oracle, (e.g. Oracle Database 11 g). SQL data definition language ("DDL") instructions are issued to a database server to create or configure database objects, such as tables, views, or complex types. In the context of graph data, an example of a graph database language that is supported by a graph database server is Green-Marl, a type of domain-specific language (DSL).

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement embodiments disclosed herein are not limited to any particular type of data container or database architecture.

Graph Database System Overview

Figure 1:
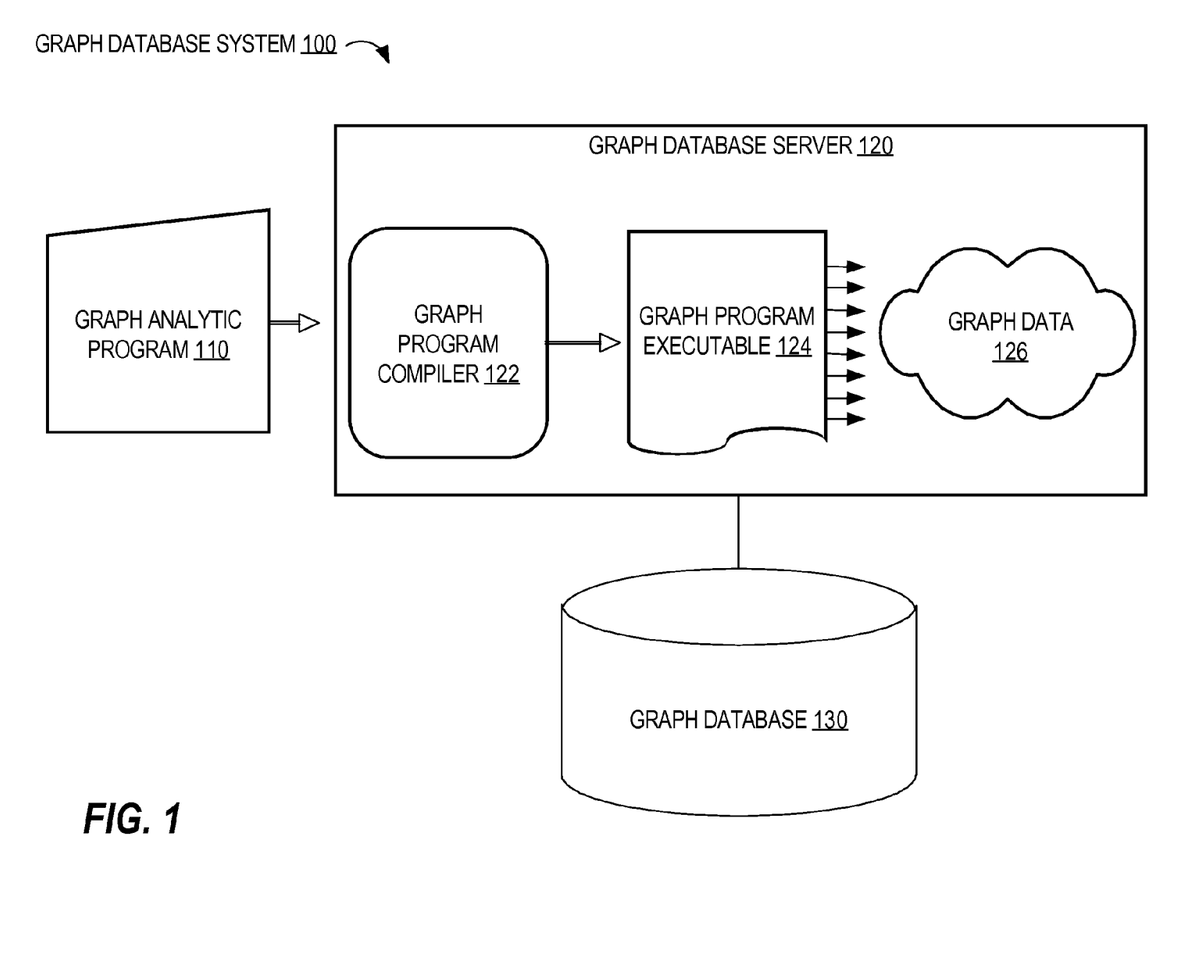
FIG. 1 is a block diagram that depicts an example graph database system 100, in an embodiment.

FIG. 1 is a block diagram that depicts an example graph database system 100, in an embodiment. Graph database system 100 includes a graph database server 120 and graph database 130 that persistently stores one or more datasets, each modeled as a graph, which is described in more detail below.

Although no clients are depicted in FIG. 1, multiple clients may be communicatively coupled, through one or more networks, to graph database system 100. The clients are configured to send graph analytic programs, such as graph analytic program 110, to graph database system 100. The clients may be configured to allow users to compose the graph analytic programs. Additionally, the same (or different) clients may send other types of requests to graph database system 100, such as RDF queries or SPARQL queries, which graph database system 100 may be configured to process against datasets stores in graph database 130 and return valid results.

Graph database server 120 is a component that is implemented on one or more computing devices. If graph database server 120 is implemented on multiple computing devices, then the computing devices may be coupled to each other. Graph database server 120 may be implemented in software, hardware, or any combination of software and hardware.

Graph database server 120 includes a graph program compiler 112 that analyzes a graph analytic program (e.g., graph analytic program 110) and generates executable code, such as graph program executable 114. Graph program compiler 112 may generate and insert, into graph program executable 114, code that does correspond to any of the code in graph analytic program 110, from which graph program executable 114 is generated. Graph program compiler 112 may be implemented in software, hardware, or any combination of software and hardware.

Alternatively to generating executable code, graph program compiler 112 may analyze a graph analytic code and, based on the analysis, generate code in a different language, such as C or Java. Such code is subsequently compiled by an appropriate compiler (e.g., a C compiler or a Java compiler) into an executable that is executed against graph data.

A graph that graph analytic program 110 targets is loaded from persistent storage into volatile memory. This loading may be performed prior to receiving the graph analytic program that targets the graph or may be performed in response to graph database server 120 receiving the graph analytic program from, for example, a client device (not shown). The graph data in volatile memory may be organized in a different format than the corresponding version that is stored persistently. For example, the graph data in volatile memory may be stored in a CSR format while the underlying data set may be stored in a node table and/or an edge table.

Graph program executable 114 includes code that, when executed by an execution engine, directly accesses graph data 116, which is stored in volatile memory.

Graph Data

As noted previously, graph database 130 stores datasets about one or more graphs, each comprising multiple nodes and edges. A graph comprises nodes (or vertices) and edges that represent relationships between the nodes. Two nodes that are connected to each other by an edge are considered neighbors of each other. A node may have many edges and, thus, many neighbors.

If graph database 130 stores multiple graphs, then each graph represents a different set of data that is to be treated separately for graph analysis purposes. For example, one graph set may reflect relationships among users in one social network while another graph set may reflect relationships among users in another social network. As another example, one graph set may reflect relationships among users in a social network while another graph set may reflect connections among computing devices in a network.

Graph database 130 may be a relational database or an object database. For example, one node table in graph database 130 may include a row for each node in a graph. (Graph database 130 may store a different node table for each graph represented in the graph data.) Each column in the node table may correspond to a different attribute or property of the node, such as a name, an age, and a date, depending on the type of object the nodes represent.

Graph database 130 may also store an edge table that corresponds to the node table. Each row in the edge table corresponds to a different edge in the graph and each column in the edge table corresponds to a node that is connected to by another node through the corresponding edge. Thus, the edge table may have at least two columns, one for each of two nodes. The edge table may also have additional columns, each additional column corresponding to an attribute or characteristic about the corresponding edge.

Nodes in a graph may represent one of many different types of objects while edges that connect two nodes in the graph may represent one of many different types of relationships between the objects. Embodiments are not limited to any particular type of object or type of relationship.

For example, nodes in a graph may represent user accounts maintained by a social network that is provided by a social network provider, such as Facebook, Google+, LinkedIn, and Twitter. An edge in such a graph may represent that the two connecting nodes have established a relationship with each other or that one of the connecting nodes has decided to "follow" the other node (as in Twitter).

As another example, nodes in a graph may represent a network, such as the Internet, and edges in the graph may represent that computing devices are physically coupled to each other.

When a graph is stored in memory from graph database 130, the names or identifiers of each node may be converted to a different value. For example, if a node represents a user account (e.g., "johnsmith1986") maintained by a social network provider, then the user identifier that identifies that user account for the social network provider may be mapped to another value, such as 2032, indicating that the user account is at least one of 2032 (or 2033) user accounts in the graph. Thus, the data and, optionally, the format of a graph that is stored in graph database 130 may be different than the data and format of the corresponding graph in memory. Furthermore, the values of node identifiers in memory may be later mapped back to their respective original values that identify real-world objects, such as email addresses, IP addresses, MAC addresses, or social network account identifiers.

Example Graph Data

Figure 2:
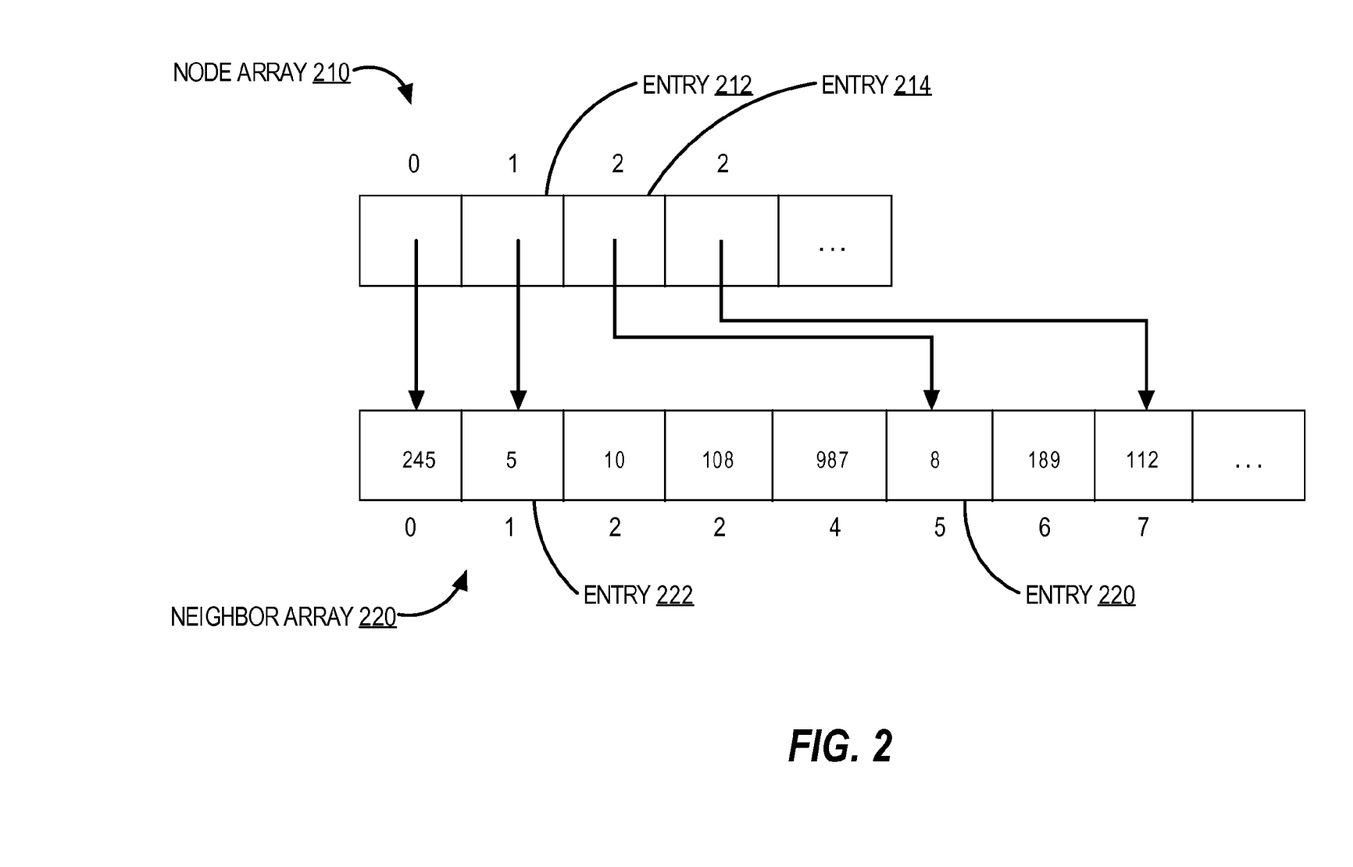
FIG. 2 is a block diagram that depicts two arrays of an in-memory representation of a graph: a node array and a neighbor array, in an embodiment.

Graph data 116 may be represented in any number of ways. Embodiments are not limited to any particular representation. FIG. 2 is a block diagram that depicts two arrays of an in-memory representation of a graph: a node array 210 and a neighbor array 220, in an embodiment. Each entry in node array 210 corresponds to a different node in a graph and includes a value (e.g., an index, a reference, or a pointer) that is used to identify an entry in neighbor array 220. For example, if a user of a social networking service has 1029 friends (or registered contacts) and a node in node array 210 corresponds to that user, then neighbor array 220 would include 1029 entries, one for each "friend" of the user.

In an embodiment, each of one or more entries in node array 210 includes one or more data values that indicate information about the corresponding node. For example, an entry in node array 210 includes a data value for one or more properties of the corresponding node. As noted previously, a property of a node may be a name, an age, a date, a time, a salary, or a description of some kind.

The "pointed-to" entry in neighbor array 220 that is "pointed to" by a "pointing" entry in node array 210 indicates that the node represented by the "pointed-to" entry is a "neighbor" of the node represented by the "pointing" entry. For example, entry 212 in node array 210 may include an index value (e.g., '1') that corresponds to entry 222 in neighbor array 220. Thus, with respect to entry 222, entry 222 is a "pointing" entry. Entry 212 is the second position in node array 210. If each node in a graph (that comprises N nodes) is given a unique value from 0 to N−1, then entry 212 corresponds to node '1' which can be used to index into node array 210 at the second position. Entry 222 includes the value '5', indicating that it can be used to index into node array 210 at the sixth position.

The neighbors of a particular node indicated in node array 210 may be determined based on (1) the "pointed-to" entry (in neighbor array 220) that the "pointing" node indicates (or references) and (2) the entry (in neighbor array 220) that the node subsequent to the "pointing" node in node array 210 indicates (or references). For example, entry 212 indicates (or references) entry 222 in neighbor array 220. Entry 214 indicates (or references) entry 230. All entries between entry 222 and entry 230 (including entry 222 and excluding entry 230) are neighbors of entry 212. Thus, the neighbors of the node indicated by entry 212 are nodes 5, 10, 108, and 987.

The set of neighbors that are indicated in neighbor array 220 and that correspond to a particular node in node array 210 is referred to herein as the "neighbor list" of the particular node. Each neighbor list is indicated by a contiguous set of entries in neighbor array 220.

In an embodiment, each neighbor list in neighbor array 220 is sorted by node value. If each neighbor list in neighbor array 220 is not sorted initially, then each neighbor list may be ordered before graph analysis operations are performed on the graph data, such as identifying common neighbors or counting triangles.

In a related embodiment, an entry in node array 210 includes two values that are used to identify neighbors of the entry. For example, entry 212 may include the values '1' and '4'. The neighbor list of entry 212 may then be determined as the nodes between (and including) the second entry and the fifth entry in neighbor array 220.

Process Overview

Figure 3:
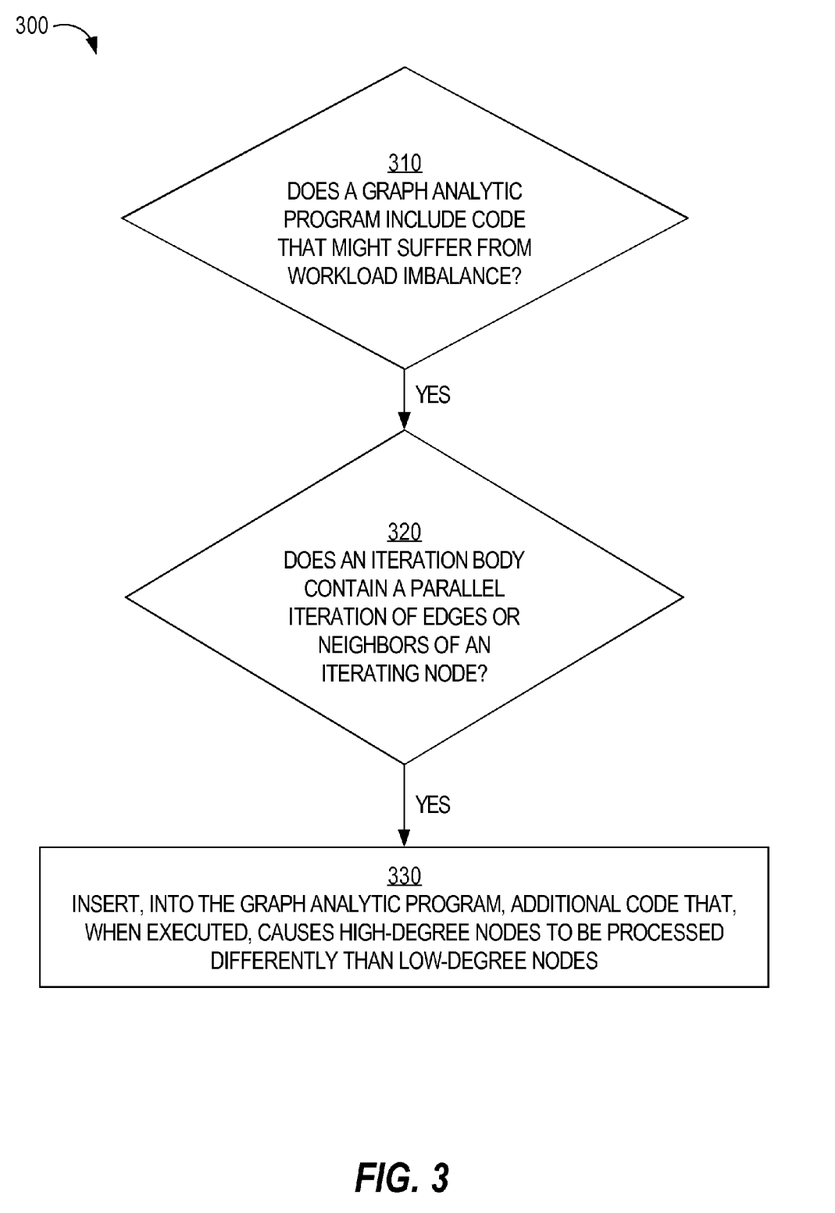
FIG. 3 is a block diagram that depicts a process for analyzing a graph analytic program.

FIG. 3 is a block diagram that depicts a process 200 for analyzing a graph analytic program, in an embodiment. Process 300 may be performed by graph program compiler 112.

At block 310, a graph analytic program is analyzed to determine whether the graph analytic program includes code that might suffer from workload imbalance due to high-degree nodes. Block 310 involves searching for a parallel iteration over a collection of nodes in a target graph (i.e., a graph that the graph analytic program targets or specifies). A collection of nodes may be all the nodes in a graph or a strict subset of all the nodes in a graph.

Depending on the language in which the graph analytic program is composed, a parallel iteration may be identified by certain keywords. For example, one domain-specific language (DSL) for graph analytic programs may use "foreach" to indicate a parallel iteration. Other languages may use a generic term (such as "for") that could be implemented either sequentially or in parallel.

Instead of an explicit parallel iteration, the semantics of the iteration may not indicate whether the iteration is parallel or sequential. Thus, it is up to the program analyzer (e.g., compiler 112) to determine whether to create an executable that has a corresponding parallel iteration or sequential iteration.

The following is an example of a code portion that indicates a parallel iteration over all nodes of a graph:

```
foreach(n : G.nodes) {  // for all nodes in graph G (in parallel)
    Γn                  // iteration body
}
``` where iteration body (Γ$_n$) comprises multiple lines.

The following is an example code portion that indicates a parallel iteration over all nodes in a collection (which may be a subset of a graph) instead of an entire graph:

```
foreach(n : C.items) {  // for all nodes in collection C (in parallel)
    Γn                  // iteration body
}
```

In an embodiment, block 310 is preceded by or succeeded by a determination of the degree of nodes in a target graph. If, for example, a target graph does not contain any nodes with a degree over a certain threshold (e.g., twenty), then rewriting the graph analytic program is not performed (at least with respect to adding code for high-degree nodes) and process 300 may end.

At block 320, the code portion that is identified in block 310 is analyzed to determine whether the body within the iteration (denoted Γ$_n$) contains an iteration over edges (or neighbors) of the iterating node n. The following is an example of such a code portion:

```
...
foreach(k : n.nbrs) {  // for all neighbors of node n (in parallel)
    Γk                 // iteration body for neighbor k
}
...
```

If the determination in block 320 is in the affirmative, then process 300 proceeds to block 330. Again, the iteration over the edges or neighbors of a node may be an explicit parallel iteration (as in the above example) or may not be explicit in the type of iteration, whether parallel or sequential.

At block 330, the graph analytic program is rewritten by inserting additional code that, when executed, causes high-degree nodes to be processed differently than low-degree nodes. Low-degree nodes are processed in parallel while high-degree nodes are processed sequentially. While high-degree nodes are processed one by one, the edges of a high-degree node are processed in parallel.

In an embodiment, processing nodes "in parallel" involves multiple threads or processes processing different nodes at the same time or concurrently. For example, thread A processes node 1 while thread B processes node 2. "Processing a node" involves processing edges, neighbors, or other attribute(s) of that node. Thus, for example, thread A processes all the edges or neighbors of node 1 while thread B processes all the edges or neighbors of node 2.

Embodiments are not limited to the number of threads, whether hardware threads or software threads (as long as there is more than one thread), or the number of cores or processors in the computing device that is executing the graph analytic program.

Processing nodes "sequentially" involves processing the nodes one node at a time. However, multiple threads work on the same node at the same time. For example, thread A processes edges 1-10 of node 1 while thread B processes edges 11-20 of node 1 while thread C processes edges 21-30 of node 1.

In a related embodiment, multiple nodes that are being processed "sequentially" may be processed at the same time. For example, while threads A and B are still working on different sets of edges of node 1, thread C (after finishing working on a set of edges of node 1) begins working on a set of edges of node 2, another high-degree node. Later, threads A and B (after finishing working on the respective edges of node 1) begin working on different sets of edges of node 2. In this way, no thread or process is idle, at least for very long.

An example of rewriting a graph analytic program in block 330 may involve rewriting the following graph analytic program:

```
1  foreach(n : G.nodes) {  // for all nodes in graph G (in parallel)
2      Γn                  // iteration body
3  }
``` into the following:

```
1   nodeSet S;                // create a set to hold high-degree
                              nodes
2   foreach(n : G.nodes) {    // for all nodes in graph G (in parallel)
3       if (n.degree( ) < Θ) {  // for only low-degree nodes
4           Γ'n               // iteration body
5       } else {              // otherwise
6           S.add(n);         // store high-degree node in set S
7       }
8   }
9   for(n : S.items) {        // for all high-degree nodes stored in
                              set S
10      Γn                    // iteration body
11  }
```

Line 3 of the modified program comprises degree check code that determines whether a node's degree is less than a certain number (i.e., θ). If so, then the node is processed in parallel with other "low-degree" nodes (in line 4). Γ'n (in line 4) is the iteration body where all parallel iterations are replaced by sequential iterations. For example, if Γ'n pertains to iterating over edges of a low-degree node, then edges of the low-degree will be processed sequentially by a single thread. Thus, vertex parallelism is exploited with respect to low-degree nodes. However, nested parallelism will not be exploited with respect to edges, neighbors, or other attributes of low-degree nodes. If the edges or neighbors of an individual low-degree node are processed by different threads, then inefficiencies (such as locking) may be introduced.

If a node's degree is not less than θ, then (in line 6), the node is considered a high-degree node and is added to node set S. Lines 9-11 involve processing high-degree nodes (i.e., nodes that have been added to node set S) in a sequential fashion, as expressed by the "for" keyword). However, attributes of a high-degree node (e.g., edges, neighbors, or other node attributes) are processed in parallel. Thus, parallelism inside iteration body (Γ$_n$) is exploited.

Parameter θ may be a default value or may be set (a) manually prior to compiling the graph analytic program or (b) automatically during runtime. For example, database server 110 (or a component thereof) may analyze the target graph to determine a number of high-degree nodes and, optionally, a degree for each node in a collection. As another example, database server 110 may determine, based on a pre-defined percentage value (e.g., 1%), the lowest degree of the node, in the target graph, that is within the top percentage (as it pertains to degree) of all nodes in the target graph. For example, if the percentage value is 1% and the $99^{th}$ percentile node (in terms of number of edges or neighbors) has degree eight hundred, then parameter Θ is set to eight hundred. The highest degree node in the target graph would have at least eight hundred edges, probably more.

As a result of process 300, a graph analytic program is transformed such that execution of a compiled version of the graph analytic program is split up into two phases. The first phase has much better load balancing due to the fact that the first phase does not have to handle high-degree nodes, whereas the second phase ensures good load balancing by handling a single high-degree node at a time in parallel.

Specific Example

The following is an example code from a graph analytic program that involves summing the weight of the edges of each node and storing the sum in association with the node:

```
1    foreach(n: G.nodes) {          // parallel vertex-iteration
2        double z = 0;
3        foreach (e: n.nbrs) {      // parallel neighbor(edge)-iteration
4            z += e.weight;         // reduction (parallel addition)
5        }
6        n.sum = z;
7    }
```

Graph Analytic Program C1

The example code in graph analytic program C1 may be transformed into the following code (e.g., by compiler 112):

```
1    nodeSet S;
2    foreach(n : G.nodes) {
3        if (n.degree( ) < Θ) {
4            double z = 0;
5            for (e: n.nbrs) {          // sequential neighbor(edge)-
                                        iteration
6                z = z+ e.weight;       // reduction (sequential
                                        addition)
7            }
8            n.sum = z;
9        } else {
10           S.add(n);
11       }
12   }
13   for(n : S.items) {                 // for all high-degree node stored in the set
         (do
         sequentially)
14       double z = 0;
15       foreach (e: n.nbrs) {          // parallel neighbor(edge)-iteration
16           z += e.weight;             // reduction (parallel addition)
17       }
18       n. sum = z;
19   }
```

Graph Analytic Program C2

In the above example, the code at lines 1, 3, 5, 9-11, 13, and 14 (in graph analytic program C2) is added. For example, degree check code (at line 3) is added, high-degree nodes are added to a node set S at line 10, and a sequential iteration over high-degree nodes is added at line 13. Additionally, the parallel neighbor iteration in line 3 of graph analytic program C1 is changed to a sequential iteration in line 5 of graph analytic program C2. In this way, a single thread or process will handle all the edges of an individual low-degree node.

Sorting Example

A special case of a graph analytic program rewrite or transformation is when the iteration body ($\Gamma_n$) contains a special operator that sorts the neighbors (or edges) of node n as in following code:

```
foreach(n: G.nodes) {
    ...
    sort(n.edges);
    ...
}
```

The above code portion sorts the edges of each node according to the edge's destination node. For example, the edges of a node n are sorted based on the degree of each destination node of node n. As another example, a weight property of an edge is used to sort the edges of a node. As another example, the edges of a node n are sorted based on a number or node identifier assigned to the destination nodes of node n. For example, the neighbors in each node's neighbor array are sorted by the neighbor's identifier. Such sort operations are referred to as semi-sorting.

Although the iteration body of the above code portion does not contain parallel iteration over edges, the compiler identifies the above pattern (i.e., a parallel iteration over multiple nodes in a graph or collection and a sort of the edges of each of the multiple nodes) and applies a special case of transformation as follows:

```
nodeSet S;
foreach(n : G.nodes) {
    if (n.degree( ) < Θ) {
        ...
        sequential_sort (n.edges)
        ...
    } else {
        S.add(n);
    }
}
for(n : S.items) {
    ...
    parallel_sort (n.edges)
    ...
}
```

In this example, compiler 112 (or another component of graph database server 120) (1) inserts degree check code to segregate high-degree nodes from low-degree nodes and (2) maps the given sort method to two different versions of a sort function: one a sequential sort and one a parallel sort. After the transformation and during execution, the low-degree nodes (i.e., nodes with degrees less than Θ) are processed in parallel but the sorting of the edges is performed sequentially with respect to the thread that is assigned to a given low-degree node. Also, because no low-degree node has a substantially high degree, load balancing is not a problem. On the other hand, high-degree nodes (i.e., nodes with degrees greater than or equal to Θ) are processed sequentially (i.e., one by one), but the sorting of edges of each high-degree node is done in parallel. This ensures that there is no large task executed by a single thread.

Benefits

Embodiments described herein have a number of benefits. One benefit is performance: high-degree nodes are treated differently than low-degree nodes such that the skewedness of the degree distribution of graphs is not as large of a factor in processing graph analytic programs that target those graphs. Another benefit is productivity: a programmer does not to have to worry about graph skewedness because graph skewedness is handled automatically by an analyzer, such as a compiler. Thus, a programmer is not required to manually specify how nodes of different degrees are going to be processed differently. In this way, a programmer does not have to write a vertex function twice: once for low-degree nodes and once for high-degree nodes. Such a reduction in time for the programmer is particularly realized if a graph analysis program involves multiple vertex functions, which would create significant programming overhead if a programmer wrote code to handle low degree nodes and high-degree nodes separately for each vertex function.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
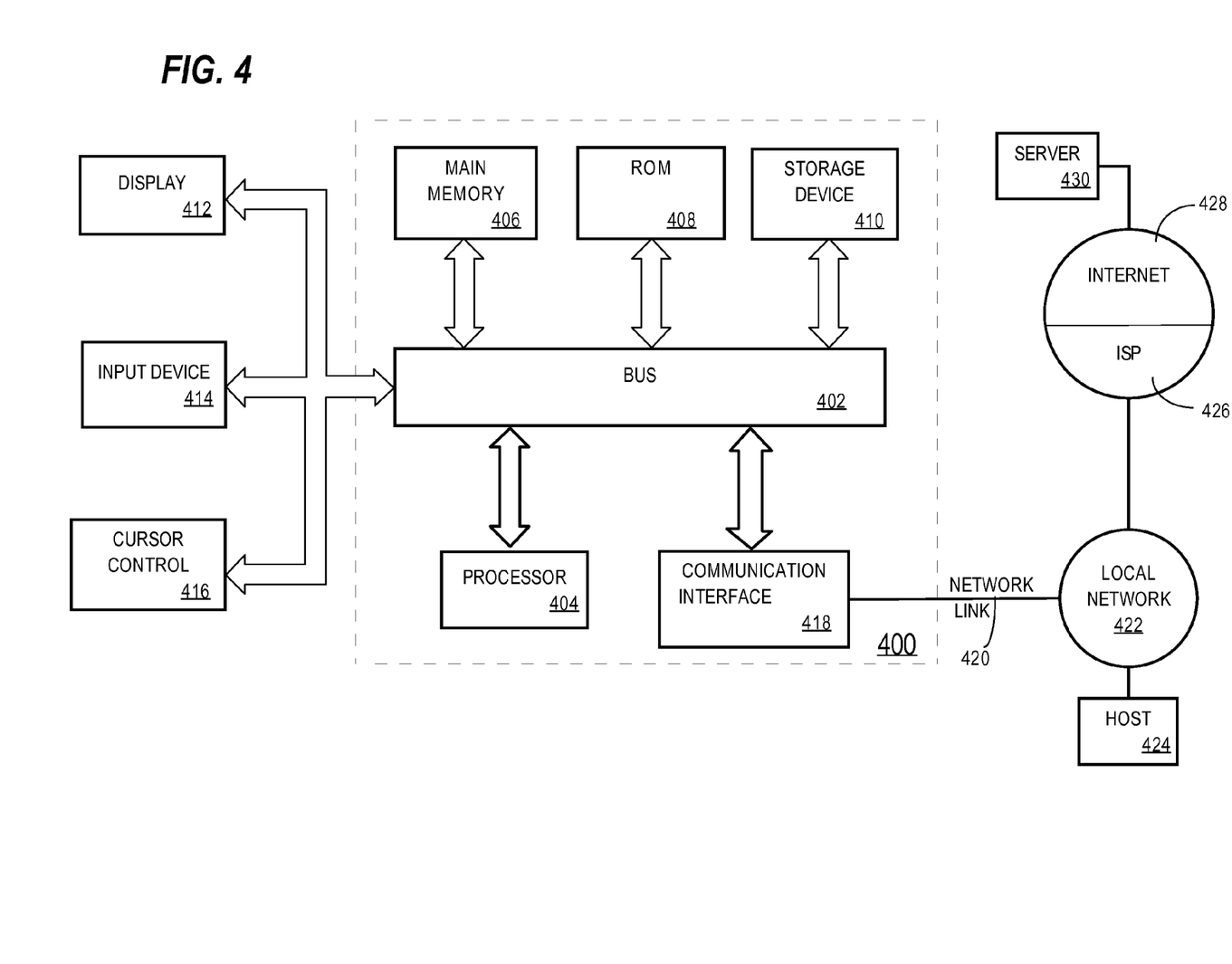
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  receiving, by a compiler, a graph analytic program that targets graph data that comprises a plurality of nodes and a plurality of edges, wherein the plurality of nodes are not executable code;
  in response to receiving the graph analytic program:
    identifying, by the compiler and within the graph analytic program, a code portion that involves processing edges of multiple nodes of the plurality of nodes; and
    inserting, by the compiler and into the graph analytic program, additional code that, when executed with at least the code portion of the graph analytic program, causes a first subset of the multiple nodes to be processed sequentially and a second subset of the multiple nodes to be processed in parallel.

2. The method of claim 1, wherein semantics of the code portion is a parallel iteration of the multiple nodes.

3. The method of claim 1, wherein the additional code, when executed, causes, for each node in the first subset, multiple edges of said each node to be processed in parallel.

4. The method of claim 1, further comprising:
  inserting, into the graph analytic program, degree check code that, when executed:
    determines, for each node of the multiple nodes, whether said each node has a threshold number of edges, and
    for each node that has the threshold number of edges, adding said each node to a set that becomes the first subset.

5. The method of claim 4, wherein:
  the code portion includes a parallel node iteration portion and an edge iteration portion; and
  the inserting the degree check code comprises inserting, into the code portion, the degree check code (1) after the parallel node iteration portion and (2) before the edge iteration portion.

6. The method of claim 4, further comprising:
  performing an analysis of the graph data to determine a number of edges of each node of the plurality of nodes; and
  identifying the threshold number of edges based on the analysis.

7. The method of claim 6, wherein:
  the performing the analysis comprises analyzing the graph data to determine a subset, of the plurality of nodes, that represents a pre-defined percentage of a total number of nodes;
  each node in the subset has more edges than each node, of the plurality of nodes, that is outside the subset;
  the identifying the threshold number of edges comprises identifying the threshold number of edges based on a node, in the subset, that has a lowest number of edges relative to other nodes in the subset.

8. The method of claim 1, further comprising:
  after the inserting the additional code into the graph analytic program, generating, by the compiler, an executable code portion based on the graph analytic program that includes the additional code.

9. The method of claim 1, wherein:
  the code portion is a first code portion;
  the method further comprising determining whether the graph analytic program includes a second code portion that is within the first code portion and that is implementable in parallel with respect to edges of each node of the multiple nodes;
  the inserting the additional code into the graph analytic program comprises inserting the additional code into the graph analytic program only in response to determining that the graph analytic program includes the second code portion.

10. The method of claim 1, wherein:
  prior to the inserting the additional code into the graph analytic program, the code portion involves, for each node of the multiple nodes, sorting a set of edges of said each node.

11. The method of claim 10, wherein:
  after the inserting the additional code into the graph analytic program:
    the additional code, when executed, involves a parallel sort of the edges of each node in the first subset;
    the code portion, when executed, involves a sequential sort of the edges of each node in the second subset.

12. One or more non-transitory storage media storing instructions which, when executed by one or more computing devices, cause:

receiving, by a compiler, a graph analytic program that targets graph data that comprises a plurality of nodes and a plurality of edges, wherein the plurality of nodes are not executable code;

in response to receiving the graph analytic program:

identifying, by the compiler and within the graph analytic program, a code portion that involves processing edges of multiple nodes of the plurality of nodes; and inserting, by the compiler and into the graph analytic program, additional code that, when executed with at least the code portion of the graph analytic program, causes a first subset of the multiple nodes to be processed sequentially and a second subset of the multiple nodes to be processed in parallel.

13. The one or more non-transitory storage media of claim 12, wherein semantics of the code portion is a parallel iteration of the multiple nodes.

14. The one or more non-transitory storage media of claim 12, wherein the additional code, when executed, causes, for each node in the first subset, multiple edges of said each node to be processed in parallel.

15. The one or more non-transitory storage media of claim 12, the instructions, when executed by the one or more processors, further causes:

inserting, into the graph analytic program, degree check code that, when executed:

determines, for each node of the multiple nodes, whether said each node has a threshold number of edges, and for each node that has the threshold number of edges, adding said each node to a set that becomes the first subset.

16. The one or more non-transitory storage media of claim 15, wherein:

the code portion includes a parallel node iteration portion and an edge iteration portion; and the inserting the degree check code comprises inserting, into the code portion, the degree check code (1) after the parallel node iteration portion and (2) before the edge iteration portion.

17. The one or more non-transitory storage media of claim 15, the instructions, when executed by the one or more processors, further cause:

performing an analysis of the graph data to determine a number of edges of each node of the plurality of nodes; and identifying the threshold number of edges based on the analysis.

18. The one or more non-transitory storage media of claim 17, wherein:

the performing the analysis comprises analyzing the graph data to determine a subset, of the plurality of nodes, that represents a pre-defined percentage of a total number of nodes;

each node in the subset has more edges than each node, of the plurality of nodes, that is outside the subset;

the identifying the threshold number of edges comprises identifying the threshold number of edges based on a node, in the subset, that has a lowest number of edges relative to other nodes in the subset.

19. The one or more non-transitory storage media of claim 12, wherein after the inserting the additional code into the graph analytic program, generating, by the compiler, an executable code portion based on the graph analytic program that includes the additional code.

20. The one or more non-transitory storage media of claim 12, wherein:

the code portion is a first code portion;

the method further comprising determining whether the graph analytic program includes a second code portion that is within the first code portion and that is implementable in parallel with respect to edges of each node of the multiple nodes;

the inserting the additional code into the graph analytic program comprises inserting the additional code into the graph analytic program only in response to determining that the graph analytic program includes the second code portion.

21. The one or more non-transitory storage media of claim 12, wherein:

prior to the inserting the additional code into the graph analytic program, the code portion involves, for each node of the multiple nodes, sorting a set of edges of said each node.

22. The one or more non-transitory storage media of claim 21, wherein: after the inserting the additional code into the graph analytic program: the additional code, when executed, involves a parallel sort of the edges of each node in the first subset; the code portion, when executed, involves a sequential sort of the edges of each node in the second subset.

* * * * *

UNITED STATES PATENT AND TRADEMARK OFFICE
CERTIFICATE OF CORRECTION

| | | |
|---|---|---|
| PATENT NO. | : 9,928,113 B2 | Page 1 of 1 |
| APPLICATION NO. | : 14/543058 | |
| DATED | : March 27, 2018 | |
| INVENTOR(S) | : Sevenich et al. | |

It is certified that error appears in the above-identified patent and that said Letters Patent is hereby corrected as shown below:

On the Title Page

On page 2, Column 2, item (56), under Other Publications, Line 5, delete "Lught," and insert -- Lugt, --, therefor.

In the Specification

In Column 8, Line 24, delete "Θ" and insert -- θ --, therefor.

In Column 9, Line 2, delete "Θ" and insert -- θ --, therefor.

In the Claims

In Column 16, Line 24, in Claim 20, delete "the method further comprising" and insert -- the instructions, when executed by one or more processors, further cause --, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*